(12) United States Patent
Dorawa et al.

(10) Patent No.: US 9,463,590 B2
(45) Date of Patent: Oct. 11, 2016

(54) METHOD FOR PRODUCING A PLASTIC FOIL TUBE AND A RELATED PLASTIC FOIL TUBE

(75) Inventors: Tobias Dorawa, Hamburg (DE); Torben Jacob, Beckdorf (DE)

(73) Assignee: Airbus Operations GmbH, Hamburg (DE)

( * ) Notice: Subject to any disclaimer, the term of this patent is extended or adjusted under 35 U.S.C. 154(b) by 491 days.

(21) Appl. No.: 12/632,899

(22) Filed: Dec. 8, 2009

(65) Prior Publication Data

US 2010/0151169 A1 Jun. 17, 2010

Related U.S. Application Data

(60) Provisional application No. 61/121,626, filed on Dec. 11, 2008.

(51) Int. Cl.

| | | |
|---|---|---|
| *B29C 49/00* | (2006.01) | |
| *B29C 53/08* | (2006.01) | |
| *B29C 67/00* | (2006.01) | |
| *B29C 49/04* | (2006.01) | |
| *B29C 51/04* | (2006.01) | |
| *B29C 51/10* | (2006.01) | |
| *B29K 105/00* | (2006.01) | |
| *B29L 23/00* | (2006.01) | |
| *B29L 31/00* | (2006.01) | |

(52) U.S. Cl.
CPC ............. *B29C 49/00* (2013.01); *B29C 53/086* (2013.01); *B29C 67/0025* (2013.01); *B29C 49/04* (2013.01); *B29C 51/04* (2013.01); *B29C 51/10* (2013.01); *B29C 2049/0089* (2013.01); *B29C 2791/006* (2013.01); *B29K 2105/258* (2013.01); *B29L 2023/003* (2013.01); *B29L 2031/003* (2013.01); *Y10T 428/1355* (2015.01)

(58) Field of Classification Search
CPC ....................................................... B29C 49/00
USPC ........................................................... 264/320
See application file for complete search history.

(56) References Cited

U.S. PATENT DOCUMENTS

| | | |
|---|---|---|
| 2,837,121 A | 6/1958 | Roberts |
| 6,793,871 B1 | 9/2004 | Richter |
| 2005/0005987 A1* | 1/2005 | Hayes et al. .................. 138/118 |

OTHER PUBLICATIONS

Yuan et al. "Control and use of wrinkles in tube hydroforming" J. of Mat. Proc. Tech. ,2007.*
German Office Action, Sep. 18, 2013.

* cited by examiner

*Primary Examiner* — Larry Thrower
(74) *Attorney, Agent, or Firm* — Greer, Burns & Crain Ltd.

(57) ABSTRACT

The invention relates to a method for producing a plastic foil tube with an intended cross-section that derives from a circular cross-section as a means for the production of fiber compound components for aviation or aerospace. It comprises the following method steps: mounting a semi-finished tube on a core tool; charging the mounted semi-finished tube with a predetermined force to press the semi-finished tube on a core cross section of the core tool, wherein while charging the mounted semi-finished tube with the force crinkles are formed in longitudinal direction of the semi-finished tube; heating the semi-finished tube to a predetermined forming temperature for a predetermined time period for the production of the plastic foil tube with the intended cross-section and stripping the plastic foil tube which is formed in such a manner and cooled down off the core tool.

28 Claims, 6 Drawing Sheets

METHOD FOR PRODUCING A PLASTIC FOIL TUBE AND A RELATED PLASTIC FOIL TUBE

CROSS-REFERENCE TO RELATED APPLICATIONS

This application claims the benefit of U.S. Provisional Application No. 61/121,626, filed Dec. 11, 2008, the entire disclosure of which is herein incorporated by reference.

FIELD OF THE INVENTION

The present invention relates to a method for producing a plastic foil tube and to a plastic foil tube which is producible by means of such a method.

According to the current state of the art the production of tubes with a cross-section that derives from a round cross-section, e.g. rectangular, squared and the like is not producible or only producible with strong restrictions concerning the formation of the geometry of the cross-section, the tolerance of the wall thickness and the development of the surface, respectively, by means of the so far used production methods. But, these kinds of tubes are needed for example for the production of hollow fiber composite components for thereby reaching a better structuring of the inner surface.

As production method for plastic foil tubes in particular the blow extrusion method is used during which liquid plastic, e.g. polymers of polyamides are extruded from a ring shaped duct into an air jet. By means of this method the production of thin walled plastic foil tubes with a cross-section that derives from a round cross-section at a simultaneous demand for a high production accuracy concerning the dimensional and the shape accuracy is not possible.

A further method for the production of tubes is a profile extrusion of plastics through a die. By means of this production technology the production of tubes with a different geometry than the round geometry is possible. Further, by means of this foils with a low wall thickness are only producible in a limited way. Certain plastic foils are not producible at all by means of this technique due to their molecular composition.

Another problem encountered with tubes with a cross-section that derives from the circular cross-section is the transport of the tubes to the usage site, since with the production of certain geometries and cross-sections, respectively, higher wall thicknesses, the application of plastics with a high E modulus as well as higher moments of inertia caused by certain cross-sections, conventional winding methods on a barrel, coiler or the like may be associated with damages of the tube.

SUMMARY OF THE INVENTION

With this background it is the object of the present invention to provide a method for producing a plastic foil tube with an intended cross-section that derives from a circular cross-section.

According to the invention this object is solved by means of a method with the features of patent claim 1.

Accordingly, a method for producing a plastic foil tube with an intended cross-section that derives from a circular cross-section is provided:
charging the mounted semi-finished tube with a predetermined force to press the semi-finished tube on a core cross section of the core tool, wherein while charging the mounted semi-finished tube with the force crinkles are formed in longitudinal direction of the semi-finished tube; heating the semi-finished tube to a predetermined forming temperature for a predetermined time period for the production of the plastic foil tube with the intended cross-section and stripping the plastic foil tube which is formed in such a manner and cooled down off the core tool.

Consequently, compared to approaches named at the beginning the present invention has the advantage that the method according to the invention enables the production of plastic foil tubes with a cross-section that deviates from the circular cross-section at a high accuracy of the geometry, sharp formation of edges with low radii, defined wall thickness, dimensional accuracy at low production costs and large tube length. By means of the different steps of the method according to the invention, tubes with a cross-section geometry that is optimized to the particular purpose are producible if a production in the extrusion process is not possible due to a low wall thickness, material-related reasons and transportation reasons.

The application spectrum of such a plastic foil tube is manifold and enables a better exploitation of the available space than in prior art at ascertained applications and thereby saving weight due to reduced material application. The application of these plastic foil tubes is for example possible in the production of composite components in which the production of parts is possible by means of those tubes, which are not producible or only producible with limitations concerning the quality of the produced components by means of the circular cross-section tubes, available until now and the resin agglomerations resulting from this, local over and under pressing, material overexpansions and leakages resulting from this.

At present, under "semi-finished tubes" is to be understood a tube with a round or circular cross-section which is provided on a coil.

The term "intended cross-section" has to be understood as a tube cross-section which is to be achieved. A first intended cross-section is formed by means of the core tool. A second intended cross-section might optionally be achieved by means of a further method step.

In the subclaims advantageous embodiments and improvements of the present invention are found.

The semi-finished tube is initially mounted on a core tool with recesses. The recesses are necessary to tighten or to adjust respectively, the semi-finished tube to the cross-section of the core tool, which means the core cross-section to the circumference of the core by means of a force which is for example created by charging with a pressure difference (vacuum) or by a forming tool, for example by specific slide rails.

When charging the mounted semi-finished tube with the force, crinkles, so-called oversize crinkles, are produced in a longitudinal direction of the semi-finished tube. These are advantageous to enable an adjustment of possible variations in the cross-section due to productions tolerances or local reinforcements, for example during the production of fiber composite components (for example with the parison technique).

The semi-finished tube which is pressed to the core cross-section in such a manner is then heated to a predetermined forming temperature, which corresponds to the material of the semi-finished tube and kept at this temperature for a predetermined period of time, for example temporary, to reduce the stresses which are generated in the material of the semi-finished tube by the forming and pressing. Therewith a first intended cross-section is reached.

The term "plastic foil tube" is to be understood as the semi-finished tube which is formed into the intended cross-section.

For stripping the formed plastic foil tube off the core tool after cooling down, the plastic foil tube might be charged with a medium, e.g. pressurized air. The charging may be temporary for separating from the core recess or for the whole duration of the removal process. A further facilitation of the stripping off as well as the mounting results from the fact that the material of the core tool has a low frictional resistance. At the same time the core tool comprises a material which is heat resistant at a predetermined forming temperature of the semi-finished tube, e.g. a plastic like PA or PTFE for example, a metal or a combination of these materials.

A plastic foil tube might then be cut to a desired final dimension.

The plastic foil tube with a cross-section that deviates from circular cross-section which is produced in this manner is also particularly characterized by its low wall thickness. The wall thicknesses are in the area of approximately 30 µm . . . 4 mm, in particular in the area of 0.2 . . . 0.3 mm.

In a preferred embodiment provision is made for that the circumference of the core cross-section of the core tool is larger than the circumference of the cross-section of the semi-finished tube. The size of the recesses in the core tool is thereby determinable in dependency on the frictional coefficients of the core and the tube material as well as on the circumference of the foil tube which is to be produced (e.g. of a plastic).

In an optional method step the formed and stripped off plastic foil tube might be inserted into a mold tool which has a second intended cross-section in a negative mold and charged with pressure and heat for forming the second intended cross-section. Thereby the crinkles of the first intended cross-section disappear in the inside of the outer contour. A direct forming of a plane coiled semi-finished tube to a geometry with sharp outer edges is not possible without the core tool.

It is also possible that the plastic foil tube is pulled through the negative mould with a predetermined velocity which is for this purpose formed as a die for a continuous forming to this second intended cross-section.

"Fiber semi-finished products" are to be understood as textiles, lay-ups and fiber mats, rovings and semi-finished products that are made from these. These are provided with a matrix, e.g. an epoxy resin and are subsequently cured to a fiber composite component by means of an autoclave.

Preferably a separation layer might be additionally provided onto the plastic foil tube which avoids a tacking of the cured fiber composite component. By means of this a removing of the plastic foil tube is eased after at least curing the fiber composite component.

The term foil tube means thin walled tubes. These tubes are for example made of polymers like for example polyamide (PA) or alternative plastics. These tubes might be single-layered or multi-layered as a combination of several layers of these materials or with an additional layer of a separation means. The wall thicknesses of these tubes are in the area of approximately 30 µm . . . 4 mm, in particular 0.2 . . . 0.3 mm.

A plastic foil tube according to the invention is produced according to the afore-mentioned method.

BRIEF DESCRIPTION OF THE DRAWINGS

In the following, the invention is explained by means of the embodiment which is presented in the schematic figures of the drawing. In the figures.

DESCRIPTION OF EXEMPLARY EMBODIMENTS

Figure 1:
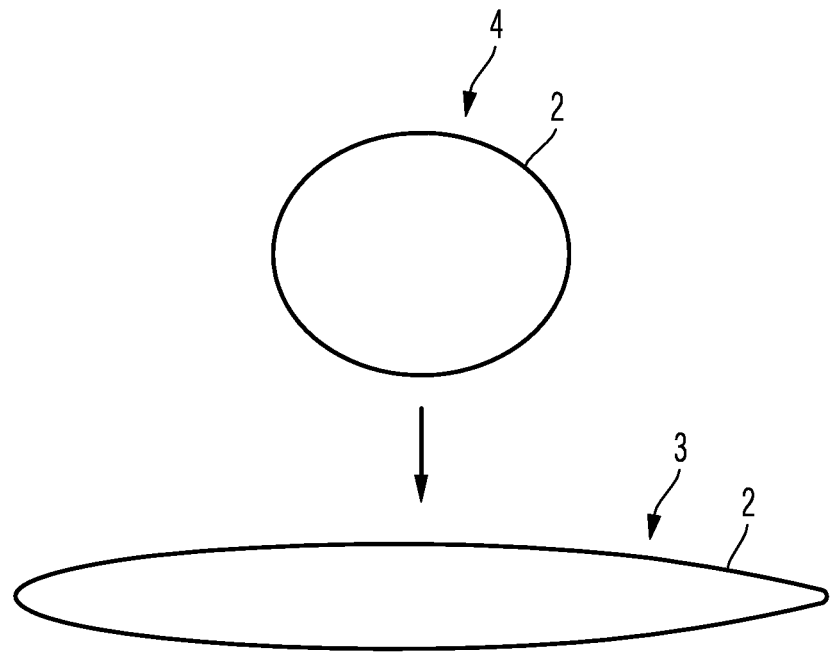
FIG. 1 shows a semi-finished tube with a circular cross-section and in a transport folding.

In the figures of the drawing the same reference symbols denote the same components or components with similar functions unless otherwise indicated.

FIG. 1 shows a cross-section of a conventional thin walled tube as semi-finished tube 2 with a round cross-section 4, respectively with a circular cross-section after the production by means of the blow extrusion method which might be folded plane 3 for transportation. This tube serves as semi-finished tube 2 for the production of a plastic foil tube 1 with an intended cross-section 6 which has a trapezoidal shape in the example shown in FIG. 2. This intended cross-section 6 is denoted in the following as second intended cross-section 6.

Figure 3:
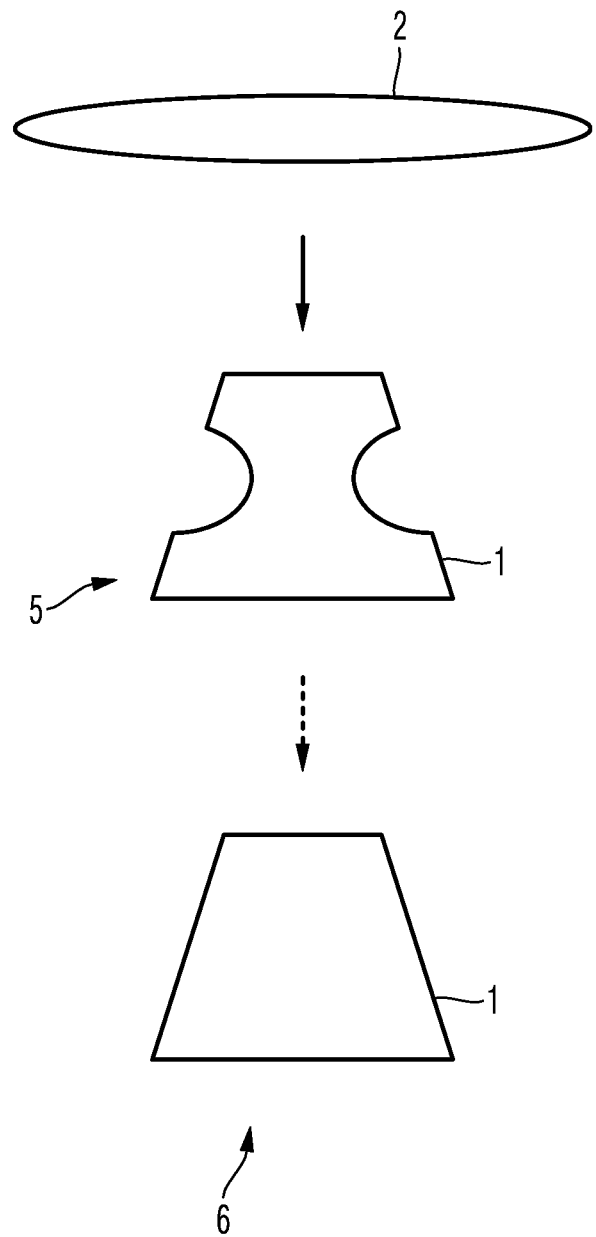
FIG. 3 shows forming steps of the semi-finished tube according to FIG. 1 into intended cross-sections according to an embodiment of a method according to the invention.

FIG. 3 schematically shows forming steps of the semi-finished tube 1 of FIG. 1 into a first intended cross-section 5 and into the second intended cross-section 6 according to an embodiment of an inventive method.

By means of the method according to the invention, tubes that are denoted as semi-finished tubes 2 which were produced by means of the extrusion method or by means of the blow extrusion method (see FIG. 1) are formable into different geometries with appropriate intended cross-sections.

The method might be divided into two forming steps.

In the following the inventive method is explained exemplary for the production of a plastic foil tube 1 with a trapezoidal cross-section (see FIG. 2) as a second cross-section 6. The production of different cross-sections is possible analogous to this example with minor modifications.

It is intended to produce a thin walled plastic foil tube 1 with the second intended cross-section 6. The application of such a plastic foil tube 1 as a means for the production of fiber composite components requires such a tube with additional oversize crinkles for balancing possibly existing deviations in a cross-section of a fiber compound component due to production tolerances or local reinforcements.

Figure 4:
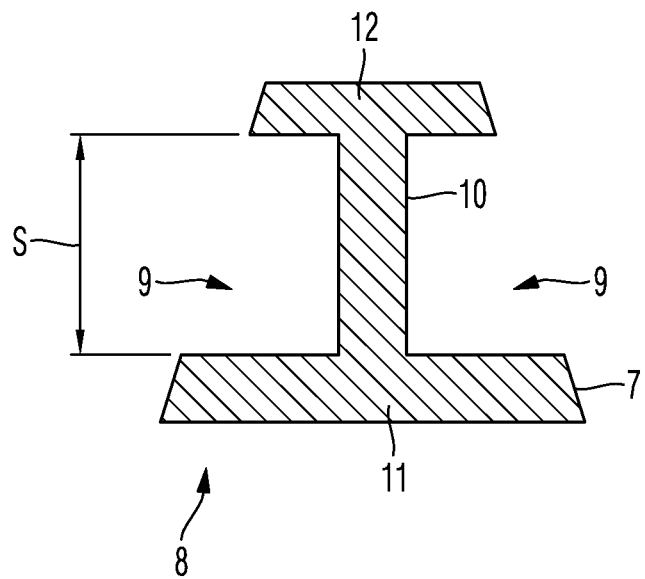
FIG. 4 shows a core cross-section of an exemplary core tool.
Figure 5:
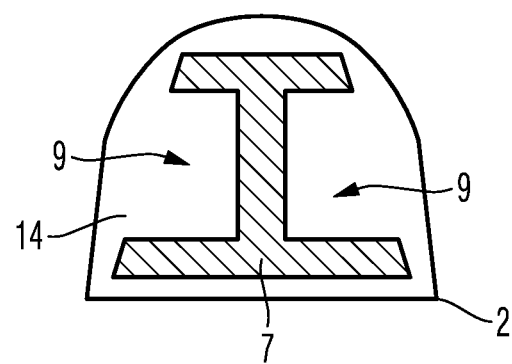
FIG. 5 shows a cross-section of a semi-finished tube which is mounted on the core tool.

In a first method step the semi-finished tube 2 is provided in a coiled form and mounted onto a core tool 7, the cross-section 8 of which is shown in FIG. 4, which is schematically depicted in FIG. 5 in a cross-sectional view.

The core cross-section 8 is formed as a trapezoid alike the second intended cross-section 6, but is provided with lateral recesses 9 which here are arranged symmetrically. It is easily imaginable that the core tool 7 is disposed perpendicular to the drawing plane and extends in this direction in a defined length. Also the recesses 9 run along this direction. By means of the recesses 9 a bar 10 is produced which is arranged in the middle, stands perpendicular with its lower end on a foot section 7 and is connected at its upper end orthogonally to a head section 12. The recesses 9 have a recess height S. By means of the recesses 9 a circumference of the core cross-section 8 is enlarged. It is preferred that this circumference is longer, respectively larger than a circumference of the semi-finished tube cross-section. The ratio of the core cross-section 8 to the circumference of the semi-finished tube cross-section thereby has to be determined depending on the frictional coefficients of the core and the tube materials as well as on the circumference of the foil tube that has to be produced. The core tool might be made of plastic, e.g. of PA (polyamid), PTFE (polythtrafluouethelene), or metal or a combination of this or different materials. The tube might be composed of a polymer plastic material, for example.

As it is apparent from FIG. 5 the core tool 7 is arranged inside an interior 14 of the semi-finished tube 2.

Figure 6:
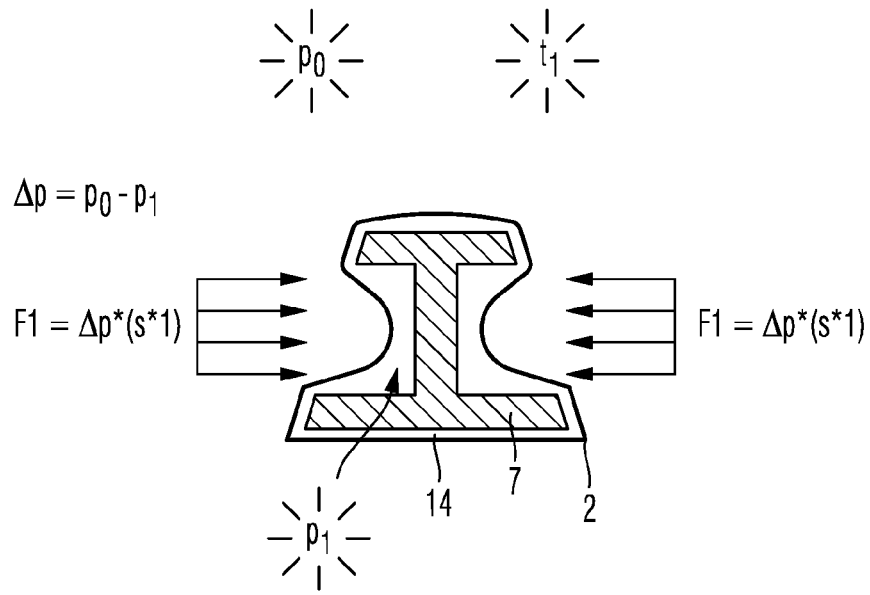
FIG. 6 shows a charging of a force for forming to the arrangement according to FIG. 5 by means of a vacuum.

In a second production step the medium is suctioned out of the interior 14 of the semi-finished tube 2 and the semi-finished tube 2 is pressed on the core cross-section 8. This is possible by an adequate design of the recesses 9 in size, position, number and shape as well as by an adequate finish of the core surface and the choice of the oversize of the semi-finished tube circumference. For this, FIG. 6 shows the charging of a force F1 for forming to the configuration according to FIG. 5 by means of a vacuum. The force F1 is equal to the product of a pressure difference $\Delta p$ of an ambient pressure p0 and in inner pressure p1 in the interior 14 of the semi-finished tube and a product of the recess height S and a length of the recess 9.

After pressing the semi-finished tube 2 on the core cross-section 8 the semi-finished tube 2 is heated to a predetermined forming temperature (here denoted as t1) and temporarily maintained on this temperature for a predetermined time period.

Figure 7:
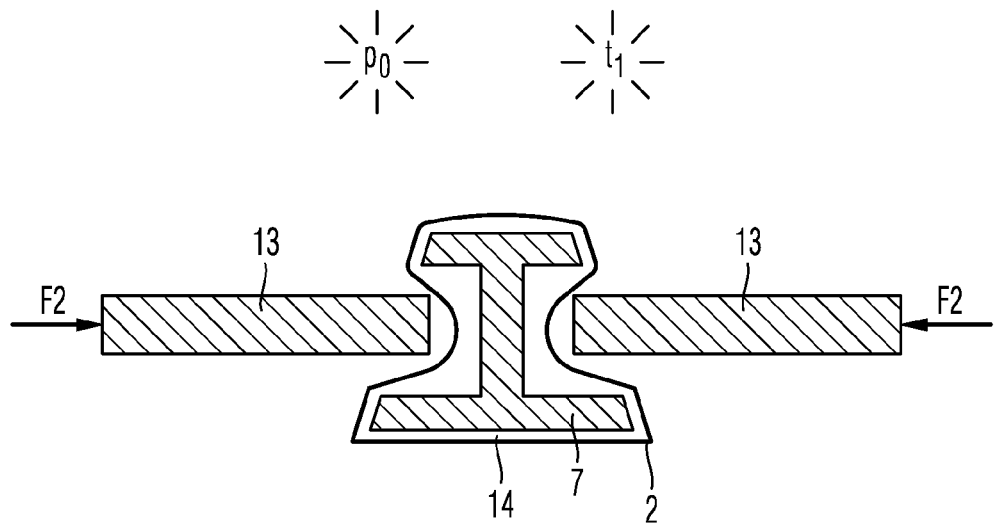
FIG. 7 shows a charging of a force for forming to the arrangement according to FIG. 5 by means of a forming tool.

Alternatively a force F2 is chargeable by means of a forming tool 13 as schematically illustrated in FIG. 7. The forming tool 13 consists in the shown example of two sliding rails which press the semi-finished tube 2 on both sides on the core cross-section 8 at a simultaneous heating and thereby produce a forming of the semi-finished tube 2.

Figure 8:
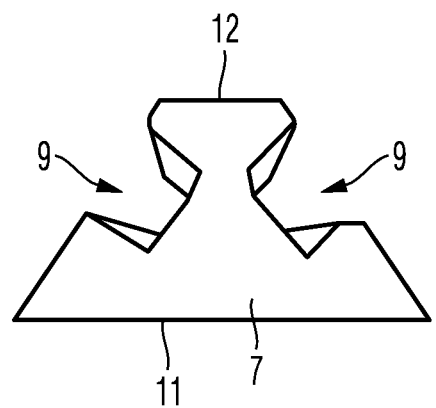
FIG. 8 shows a vanishing point projection of a frontal view of a further core tool.

FIG. 8 shows a vanishing point projection of the core tool 7 from which the longitudinal extension of the recesses 9 between the foot section 11 and the head section 12 becomes apparent.

Figure 9:
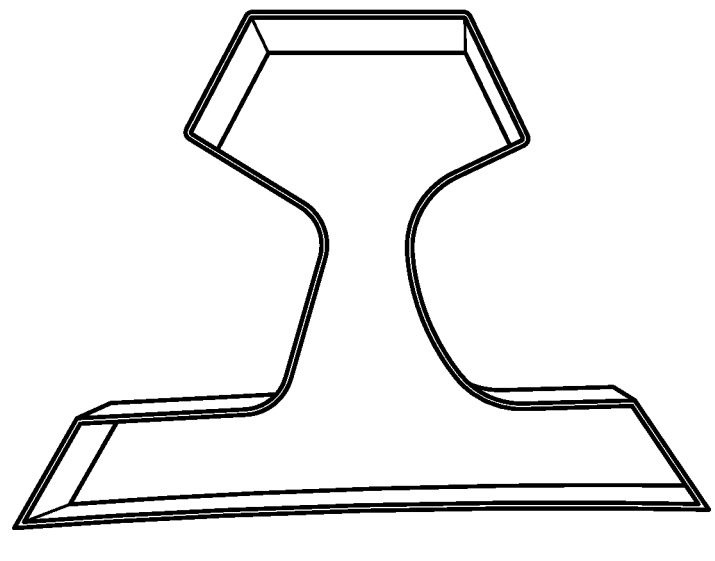
FIG. 9 shows a cross-sectional view of a plastic foil tube with an intended cross-section produced according to the inventive method.

After cooling down the semi-finished tube 2 which was formed in this way the semi-finished tube 2 is strippable off the core tool 7 in a further step. Thereby a supporting medium, e.g. pressurized air may be guided into the interior 14, temporarily or for the duration of the whole demolding process. The formed semi-finished tube 2 formed in this way is now the plastic foil tube 1 with the first intended cross-section 5 which is shown in FIG. 9 cut to a predetermined end length in a three-dimensional cross-sectional view. Thereby sharp edges in the edge areas of foot section 11 and head section 12 are viewable.

Figure 10:
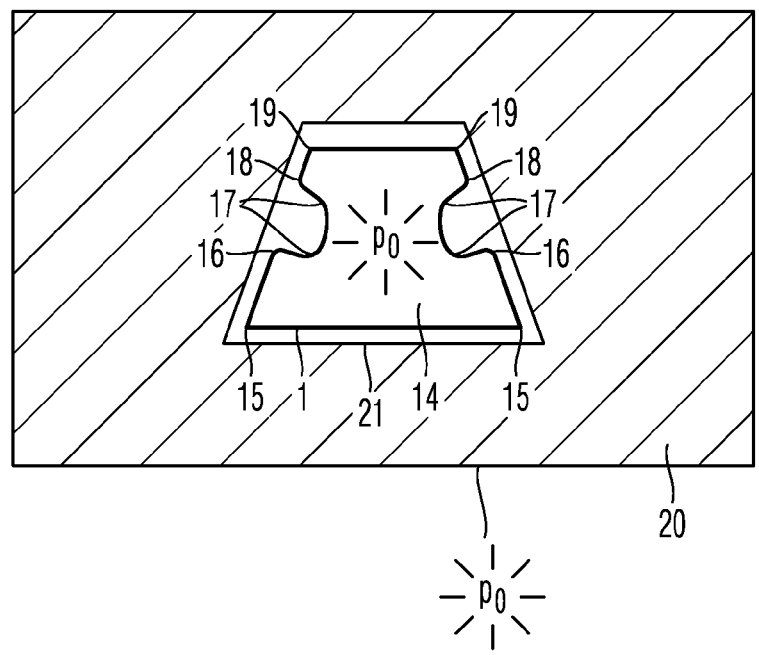
FIG. 10 shows a cross-sectional view of a plastic foil tube in a negative mold for forming to a further intended cross-section.

FIG. 10 shows a sectional view of a plastic foil tube 1 in a negative mold 21 of a forming tool 20 for forming into a further, namely the second intended cross-section 6.

Initially crinkles on the plastic foil tube 1 are explained. At the lower side the plastic foil tube 1 comprises foot crinkles 15 with a sharp edge. In the area of the sides portions are viewable which protrude into the interior 14 and which have been produced by pressing into the recesses 9 of the core tool 7. These portions comprise lower resection crinkles 16 and upper resection crinkles 18 as well as rounded inner resection crinkles 17 which are arranged on the portion that protrudes into the interior 14. Sharp edged head crinkles 19 are arranged in the upper area of the plastic foil tube 1.

Figure 2:
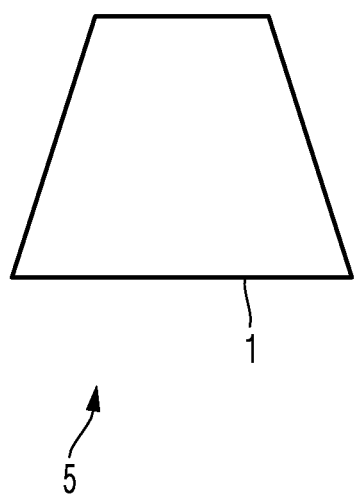
FIG. 2 shows an exemplary intended cross-section.
Figure 11:
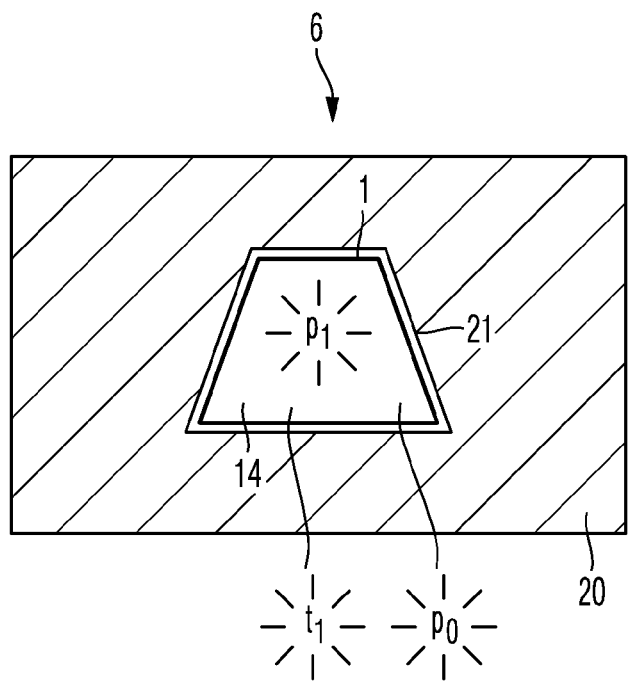
FIG. 11 shows a cross-sectional view of the plastic foil tube in a negative mold with the further intended cross-section.

The negative mold 21 in the forming tool 20 comprises a cross-section corresponding to the second (in this example trapezoidal shape) intended cross-section 6 (see FIG. 2). The interior of the plastic foil tube 1 has the ambient pressure p0 but is pressurized in the next step with a pressure p1 which causes the portions that protrude into the interior 14 to attach to the walls of the negative mold 21 as is illustrated in FIG. 11. At the same time, the arrangement is heated to a predetermined forming temperature of the plastic foil tube 1. Thereby, the plastic foil tube 1 is plastically formed to the second intended cross-section 6.

This optionally second forming step in the negative mold serves inter alia for the removal of the crinkles 15 . . . 19 which have been produced in the first forming step on the core tool 7. A direct forming of the flat packed semi-finished tube 2 (FIGS. 1 and 3) to a geometry with sharp outer edges is not possible without the first forming step.

The forming tool 20 for this second forming step is also imaginable for continuous method, by means of which the plastic foil tube 1 is pulled through the negative mold 21, which thereby serves as a die with a predetermined velocity and is thereby formed to the second intended cross-section 6.

In the following further advantages of the method according to the invention are named in headwords:
  good reproduction of curbs and edges with low radii.
  possibility to produce adapted tubes at face, thereby low transportation costs.
  the method according to the invention is suitable for a large spectrum of geometries, cross-sections, materials and wall thicknesses (about 30 μm . . . 4 mm, in particular in the area of 0.2 . . . 0.3 mm).
  the method according to the invention is partly automatable.
  the method according to the invention further gives a possibility for the production of cost effective and qualitatively high class fiber compound components, for example for aviation or aerospace.

The invention is not limited to the specific method for producing a fiber compound component in aviation and aerospace as depicted in the figures.

The geometry of the intended cross-sections is modifiable in various manners. It is possible to produce more than two intended cross-sections, for example in several forming steps.

Furthermore, applications are imaginable at which plastic foil tubes 1 with a respective intended cross-section 5, 6 are used for the transport of liquid or gaseous media where only an ascertained installation space is available. By means of the possibility to produce tubes with an adapted cross-section the installation space is usable better.

The invention relates to a method for producing a plastic foil tube 1 with an intended cross-section 5, 6 that derives from a circular cross-section. It comprises the following method steps: mounting a semi-finished tube 2 on a core tool 7; charging the mounted semi-finished tube 2 with a predetermined force F1, F2 to press the semi-finished tube 2 on a core cross-section 8 of the core tool 7; heating the semi-finished tube 2 to a predetermined forming temperature for a predetermined time period for the production of the plastic foil tube 1 with the intended cross-section 5, 6; and stripping the plastic foil tube 1 which is formed in such a manner and cooled down off the core tool 7.

LIST OF REFERENCE NUMERALS 1 plastic foil tube
2 semi-finished tube
3 transportation folding
4 circular cross-section
5 first intended cross-section
6 second intended cross-section
7 core tool
8 core cross-section
9 recess
10 bar
11 foot section
12 head section
13 forming tool
14 interior
15 foot crinkle
16 lower recess crinkle
17 inner recess crinkle
18 upper recess crinkle
19 head crinkle
20 forming tool
21 negative mold
F1 . . . 2 force
p0 . . . 1 pressure
S recess height
t1 temperature

The invention claimed is:

1. A method for producing a plastic foil tube with an intended cross-section that derives from a circular cross-section, comprising the following method steps:
   mounting a semi-finished tube on a core tool such that the core tool extends longitudinally within the semi-finished tube;
   charging the mounted semi-finished tube with a predetermined force, wherein said predetermined force is applied and acts in a direction transverse to a longitudinal direction of the semi-finished tube to press the semi-finished tube into one or more recesses of a core cross-section of the core tool within the semi-finished tube, whereby elongate crinkles are formed in the semi-finished tube which extend in said longitudinal direction;
   heating the semi-finished tube to a predetermined forming temperature for a predetermined time period for the production of the plastic foil tube with the intended cross-section; and
   stripping the plastic foil tube formed in such a manner off the core tool after the plastic foil tube has cooled down.

2. The method according to claim 1, wherein the charging of the mounted semi-finished tube with the force is carried out by charging with a pressure difference.

3. The method according to claim 1, wherein the charging of the mounted semi-finished tube with the force is carried out by means of at least one forming tool.

4. The method according to claim 1, wherein for stripping the formed plastic foil tube off the core tool the plastic foil tube is pressurized by means of a medium.

5. The method according to claim 1, wherein the formed and stripped off plastic foil tube is inserted into a forming tool which comprises the intended cross-section in a negative mold, and wherein the plastic foil tube is charged with pressure and heat for forming the intended cross-section.

6. The method according to claim 5, wherein for a continuous forming into the intended cross-section by means of the negative mold which is for this purpose formed as a die, the plastic foil tube is pulled through the die with a predetermined velocity.

7. The method according to claim 1, wherein the circumference of the core cross-section of the core tool is larger than the circumference of the cross-section of the semi-finished tube.

8. The method according to claim 1, wherein the core tool comprises recesses for tightening the semi-finished tube which is to be mounted on the core tool.

9. The method according to claim 1, wherein the core tool is made from a material which is temperature-stable at the predetermined forming temperature and which has a low friction resistance.

10. The method according to claim 1, wherein the material of the core tool is a plastic.

11. The method according to claim 1, wherein the semi-finished tube is single-layered.

12. The method according to claim 10, wherein the material of the core tool is one of polyamide or polytetrafluoroethylene.

13. The method according to claim 1, wherein the material of the core tool is a metal.

14. The method according to claim 1, wherein the material of the core tool is a combination of plastic and metal.

15. The method according to claim 1, wherein the semi-finished tube is multi-layered.

16. The method according to claim 1, wherein the formed plastic foil tube is coated with at least one layer.

17. The method according to claim 16, wherein the at least one layer is a separation layer.

18. A method for producing a plastic foil tube with an intended cross-section, comprising:
   mounting a semi-finished tube on a core tool such that the core tool is arranged within the semi-finished tube;
   charging the mounted semi-finished tube with a predetermined force by applying said force to the semi-finished tube in a direction transverse to a longitudinal direction of the semi-finished tube to press the semi-finished tube into at least one recess of a core cross-section of the core tool within the semi-finished tube, whereby one or more elongate folds are formed in the semi-finished tube, each of which folds extends in said longitudinal direction;
   heating the semi-finished tube to a predetermined forming temperature for a predetermined time period for the production of the plastic foil tube with the intended cross-section; and
   stripping the plastic foil tube formed in this a manner off the core tool after the plastic foil tube has cooled.

19. The method according to claim 18, wherein the charging of the mounted semi-finished tube with the force is carried out by charging with a pressure difference.

20. The method according to claim 18, wherein the charging of the mounted semi-finished tube with the force is carried out by means of at least one forming tool.

21. The method according to claim 18, wherein for stripping the formed plastic foil tube off the core tool the plastic foil tube is pressurized by means of a medium.

22. The method according to claim 18, wherein the formed and stripped off plastic foil tube is inserted into a forming tool which comprises the intended cross-section in a negative mold, and wherein the plastic foil tube is charged with pressure and heat to form the intended cross-section.

23. The method according to claim 22, wherein the negative mold is formed as a die, and wherein the plastic foil tube is pulled through the die with a predetermined velocity to continuously form the intended cross-section.

24. A method for producing a thin-walled plastic tube having an intended cross-section, comprising:
   mounting a semi-finished tube on a core tool;
   applying a predetermined force to the mounted semi-finished tube to press the semi-finished tube into at least one recess of a core cross-section of the core tool within the semi-finished tube thereby to form one or more elongate folds in the semi-finished tube, each of said one or more elongate folds extending in a longitudinal direction of the semi-finished tube;
   heating the semi-finished tube to a predetermined forming temperature for a predetermined time period for the production of the thin-walled plastic tube with the intended cross-section; and
   cooling the thin-walled plastic tube formed in this manner and removing the thin-walled plastic tube from the core tool.

25. The method according to claim 24, wherein the applying of the predetermined force to the semi-finished tube is carried out by charging with a pressure difference.

26. The method according to claim 24, wherein the applying of the predetermined force to the semi-finished tube is carried out by means of at least one forming tool.

27. The method according to claim 24, wherein the thin-walled plastic tube removed from the core tool is inserted into a forming tool which comprises the intended cross-section in a negative mold, wherein the thin-walled plastic tube is charged with pressure and heat to form the intended cross-section.

28. The method according to claim 27, wherein the negative mold is formed as a die, and wherein the thin-walled plastic tube is pulled through the die with a predetermined velocity to continuously form the intended cross-section.

* * * * *